INVENTOR
F.H.P. WEHMEIER
BY *George S. Indig*
ATTORNEY

3,600,143
GROWTH OF CRYSTALLINE CHALCOGENIDE SPINELS
Friedel H. P. Wehmeier, Murray Hill, N.J., assignor to Bell Telephone Laboratories, Incorporated, Murray Hill and Berkeley Heights, N.J.
Filed Sept. 30, 1968, Ser. No. 763,626
Int. Cl. B01d 5/00
U.S. Cl. 23—294                    6 Claims

ABSTRACT OF THE DISCLOSURE

Crystalline chalcogenide spinels, such as $CdCr_2Se_4$, are grown by a vapor transport process using the spinel as a solid source. Growth at temperatures above the decomposition temperature of the spinel is expedited by an overpressure of selenium produced by the use of elemental selenium as an initial ingredient. Both closed and open tube procedures are described.

BACKGROUND OF THE INVENTION

(1) Field of the invention

The invention is concerned with the growth of crystalline $CdCr_2Se_4$ and related chalcogenide spinels. Such compositions are under study by a number of workers both here and abroad by reason of magnetic, optical and semiconducting properties. Classes of device uses include those in which optical transmission properties and/or semiconductor properties are varied by application of a magnetic field.

(2) Description of the prior art

Vol. 15 of Physical Review Letters, p. 493 for 1965, contains a disclosure of a ferromagnetic spinel material which at once stimulated widespread interest in a variety of fields. That, and subsequent work, revealed $CdCr_2Se_4$ and related materials to be domain magnetic (ferromagnetic, ferrimagnetic and/or antiferromagnetic, depending on temperature and composition) and semiconducting (materials ordinarily p-type as made may be doped with various compensating impurities). Related properties, such as the dependence of semiconductor properties on applied fields and magneto-optic effects, have been of particular device interest. As is so often the case, an investigation of such properties has been seriously hindered by the general unavailability of suitable crystalline sections of requisite perfection.

Initial materials were polycrystalline, but reported experimental results were soon based on crystals generally prepared by what most workers considered to be solid-solid interaction. Probably the most successful of these procedures was that reported in vol. 38, Journal of Applied Physics, p. 965 (1967). This procedure uses chromium trichloride together with the appropriate sulfide or selenide. Crystals produced are typically small fractions of a millimeter in major dimension.

Probably the small crystal product resulting from such solid-solid interactions are typical of such procedures, and significant increase in resulting crystal dimension is not to be expected. Attempts to grow crystals by other techniques have apparently been unsuccessful. Use of many alternate procedures has never seemed promising based on the presumption that growth temperatures could not exceed the known decomposition temperature of the crystalline product. Since $CdCr_2Se_4$, for example, decomposes at a fairly rapid rate of about 700° C., and, based on the very low vapor pressures of feasible starting ingredients at such temperature, vapor growth seemed to be precluded.

Many contemplated devices, which depend for their operation on the various characteristics noted, desirably make use of deposited layers of the spinel material. Systems reported to date are not ideally directed to such structures. Obstacles include the formation of solid state product other than the spinel and growth rates which are controlled only with difficulty.

SUMMARY OF THE INVENTION

Crystals of the chalcogenide spinels, $ACr_2X_4$, in which A is at least one element of the group consisting of zinc, cadmium and mercury, and in which X is sulfur and/or selenium, are grown by a vapor transport process at temperatures in excess of the presumed decomposition temperature of the spinels. Growth proceeds within a temperature gradient with feed material including the desired spinel at a high temperature and with crystallization taking place at some lower temperature. The spinel feed may be introduced as an initial ingredient or may be reacted in situ as, for example, by use of AX and $Cr_2X_3$. Transport is brought about by use of the chloride or bromide of cadmium. Decomposition of the spinel is impeded or prevented by the presence of an overpressure of selenium resulting from the introduction of elemental selenium as an initial ingredient.

The responsible mechanism is reversible, chemical transport with the spinel $ACr_2X_4$ as the only deposited solid product. Deposition rates are controllable and respond to changes in temperature gradient, to reaction temperatures, and, in flow systems, to the rate of introduction of the carrier gas as well. For these reasons, the inventive procedures are the best thus far reported for growth of deposited layers.

Reported systems for growing cadmium chromium selenide have been carried out in sealed containers and the inventive procedures may also be practiced in this manner. They may also be carried out as open tube or flow procedures using either the same starting ingredients or different ingredients as discussed in detail further on. All procedures practiced in accordance with this invention require an overpressure of X (selenium or sulfur) resulting from the introduction of the elemental material. Since its omission results in decomposition of the spinel, this reduces yield and introduces at least one additional deposition product, so interfering with orderly crystallization. The crystalline product of the described procedures share the characteristics already attributed to the spinel compositions. These include ferromagnetism, semiconductivity, optical transparency, and certain interrelated characteristics. Certain device uses may be optimized by mixed compositions as by use of one or more A cations and/or both X anions. Other device uses are aided by inclusion of certain additives. All such composition variables may be achieved by use of the inventive procedures.

DETAILED DESCRIPTION

(1) Included materials

Figure 1:
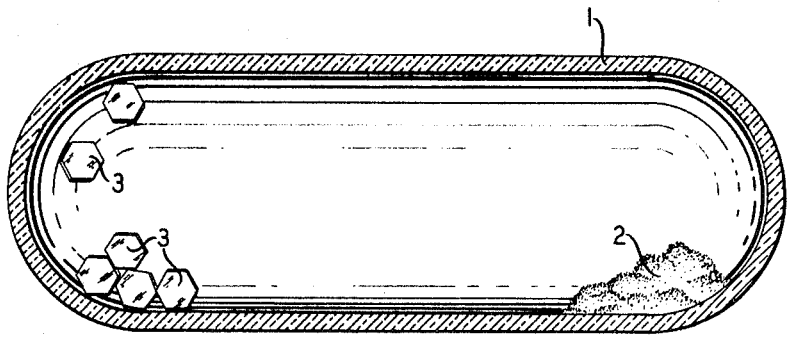
FIG. 1 is a front elevational view, partly in section, of apparatus suitable for the practice of an embodiment of the invention.

It has been indicated that a solid feed ingredient is, itself, the reacted spinel composition of interest. This may be introduced already reacted, or it may be reacted in situ. Where the latter approach is used, starting ingredients may be AX and $Cr_2X_3$. It is generally desirable that these binary reactants be introduced in near stoichiometric amount (equimole). The relative amounts of such binary ingredients are of less importance in a flow system since non-spinel product may be continously removed. Regardless of whether the spinel is produced in the chamber or introduced as such, its physical form is not critical. Vaporization is, of course, expedited by large surface area and, to this end, a particulate form is suitable. Most unintentional impurities are transported with the spinel and, therefore, the tolerable amount of such inclusions is to be determined in accordance with the desired purity of the end product. Such considerations entail ultimate device use as discussed further on. The maximum tolerable impurity level in any event is that which interferes with the formation of the spinel structure. So long as a spinel is present at the feed position, this desideratum is generally satisfied.

Transport is brought about by the presence of $ACl_2$ and/or $ABr_2$. This medium is generally added as the already reacted compound. While the rate of deposition may be controlled by controlling the amount of the transport medium, it is generally preferable to control deposition via control of temperature or temperature gradient since the transport reaction is generally not undesirably rapid. To this end, it is preferable to maintain that pressure of $ACl_2$ or $ABr_2$ vapor which corresponds with the equilibrium pressure of the vapor phase over the liquid. As an example, in a closed sytem operating over the temperature of from 700° C. to 800° C., this requires the presence of about 1 mg. $CdCl_2$ per cubic centimeter volume. Exceeding the amount of transport medium required for such pressure only results in an excess liquid reservoir which is generally harmless. Since a minimum of medium transport rate for many purposes results at about one-tenth of the equilibrium pressure, this value may be considered a minimum.

The excellent product which results by use of the described procedures depends upon the presence of sulfur or selenium vapor to minimize decomposition of the spinel. Preferred operation suggests an amount of elemental selenium which corresponds with the equilibrium vapor pressure over the liquid phase. This amount, which may be exceeded without disadvantageous result, is of the order of 2 mg. selenium per cubic centimeter volume within a temperature range from about 700° C. to about 800° C. The minimum tolerable overpressure is about one-tenth of the equilibrium value since lesser amounts are substantially ineffectual in preventing spinel composition. An appropriate sulfur content is at a maximum of about 3 atmospheres since substantially greater amounts impede the transport reaction.

Various additives may be introduced either with the spinel feed or separately. These include copper, zinc, iron, manganese, nickel, and cobalt (added as the element, a halide, the selenide or the sulfide).

The materials enumerated above are sufficient for growth within a sealed chamber. Certain variations and/or additions are required or permitted in a flow system. One additional required starting ingredient is the flowing gas. This may be any material or mixture of materials inert to the chemical system. Suitable gases include argon, nitrogen and helium.

Again, a flow system may utilize the spinel as a feed ingredient, either introduced per se or reacted in situ, or, alternatively, may utilize reactants which form the spinel after volatilization.

Reactant feed compositions which may be utilized in flow systems are of two types. In the first, the decomposition products of the reversible transport reaction are directly incorporated. These are chromium selenium, $Cr_2Se_3$, elemental A such as metallic cadmium, and elemental X such as selenium. In the second, the spinel at the deposition site results from the volatilization of chromium trichloride and AX. Such ingredients are desirably introduced in the mol ratio of 2:1 for $AX_2:CrCl_3$ since this corresponds with stoichiometric introduction. Considerable variation is permitted with increasing deviation from the indicated mol ratio having the primary effect of reducing yield.

The two alternative flow systems last discussed may result in the production of a deposited phase other than the spinel. This need not be disadvantageous in a flow system since provision may be made for continual removal of such additional material.

It is to be understood that all procedures carried out in accordance with the invention require as the transport medium either $ACl_2$ or $ABr_2$, and also selenium is introduced as the element. Even where elemental selenium is introduced as a necessary reactant to produce the spinel, and additional amount of selenium desirably sufficient to produce the noted overpressure (at least one-tenth of the equilibrium pressure over the liquid phase) is needed.

(2) Growth conditions

Experimentation has indicated the closed system to operate in accordance with the following endothermal reversible reaction:

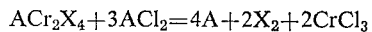

$$ACr_2X_4 + 3ACl_2 = 4A + 2X_2 + 2CrCl_3$$

To minimize decomposition, it is necessary to maintain an overpressure as discussed. While from the equation it might appear that such decomposition could be avoided by use of either X or A, A is ineffectual since it immediately reduces to AX. The temperature range over which growth proceeds at an expedient rate in the sealed system is set at from 700° C. to 900° C., these temperatures being set at the feed position. The minimum is determined by the observation that transport is inexpediently slow at lower temperatures. If the maximum is exceeded, it is difficult to impede spinel decomposition sufficiently. A preferred temperature range of from 700° C. to 850° C. is indicated for optimization.

The temperature range is not as critical in flow systems based on the invention since transport is, to some extent, dependent upon the flowing atmosphere and since additional products resulting, for example, from decomposition may be removed. Nevertheless, the temperature ranges set forth are preferred also in the flow systems.

The desired temperature gradient is within the range of from 10° C. minimum to a maximum value which results in a temperature of at least 650° C. at the nucleation position. Lesser gradients result in a reduction of the transport rate to generally desirably low values, and steeper gradients, resulting in temperatures below 650° C., result in difficulty controlled growth and in spontaneous nucleation along the gradient. Further, at temperatures below 650° C., condensation of both $ACl_2$ (e.g. $CdCl_2$) and X (e.g. Se) becomes a problem. Such condensation contaminates the final product.

(3) Detailed description of the drawing

Suitable apparatus for carrying out the sealed reaction is shown in FIG. 1. Ampule 1, constructed, for example, of fused guartz, contains starting material 2. Growth of spinel may occur as crystalline mass 3. Not shown is a furnace or other means for maintaining a temperature gradient in such direction that starting material 2 is at least 10° hotter than crystallizing material 3.

Figure 2:
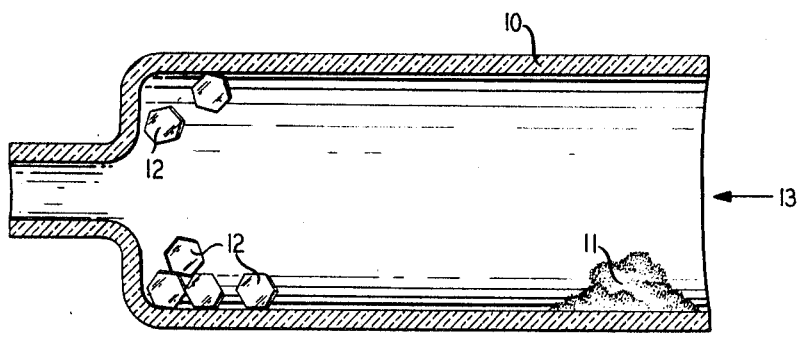
FIG. 2 is a front elevational view, partly in section, of apparatus suitable for the practice of another embodiment of the invention.

FIG. 2 depicts an open tube 10, again, containing starting material 11 and crystallizing material 12. The direction of flowing carrier gas is depicted as arrow 13. Heating means, not shown, results in maintenance of a temperature gradient from 11 to 12.

(4) Process

The general procedure is described. It will be recognized that certain of the steps merely represent good laboratory practice and are otherwise unessential.

(a) The container is cleaned as with an aqueous mixture of hydrofluoric and nitric acid after which it is dried at a temperature sufficient to remove moisture (about 110° C.).

(b) Starting ingredients are next placed directly into a container, and, if the procedure is to be carried out in a sealed container, it is pumped to a vacuum level conveniently attained by use of a floor pump. A pressure of $10^{-1}$ torr is adequate to prevent oxidation.

(c) The container is sealed while on pump.

(d) Container and contents are next heated, for example, by placing in a furnace already at temperature, and the requisite temperatures and gradient are established.

(e) Growth is now permitted to proceed either in the sealed system or with flowing gas. The final product, which may appear as individual crystals or as a deposited layer on a provided substrate, may be fabricated directly into the desired device form.

(5) Example

This example is illustrative of the transport reaction. The particular system chosen utilized a sealed vessel. A transparent silica ampule having an internal diameter of 19 mm. and a total length of 120 mm. was used. Starting materials, 30 mgr. $CdCl_2$, 65 mgr. Se, and 1000 mgr. $CdCr_2Se_4$, were inserted through a funnel after which the ampule was evacuated to $10^{-2}$ torr and was sealed off with a hydrogen torch. The ampule containing the starting material was heated in a horizontal resistance furnace with two independent heaters. Temperatures of 795° C. and 695° C. were established at the starting material and opposite end of the ampule, respectively. A yield of about 50 mgr. of $CdCr_2Se_4$ resulted at the cool end of the ampule within a period of fourteen days. The resulting product was ferromagnetic at liquid nitrogen temperature and analysis otherwise revealed it to be the expected spinel composition. The only other solid phase material observed at the termination of the growth process was elemental selenium and cadmium chloride.

The invention is dependent upon the use of selenium or sulfur introduced as the elemental material as specified. All forms of the inventive process also include $ACl_2$ or $ABr_2$ (i.e. $CdCl_2$, $HgCl_2$, $ZnCl_2$ and the respective bromides). It is to such initial ingredients that the excellence of the crystalline product is attributed.

What is claimed is:

1. Method for crystallizing a composition of the spinel structure which consists essentially of a composition which may be represented by the formula $ACr_2X_4$ in which A is at least one element selected from the group consisting of zinc, cadmium and mercury, and in which X is at least one element selected from the group consisting of sulfur and selenium comprising heating ingredients to an elevated temperature characterized in that said process includes transport of vapor produced by volatilization of said ingredients, in that said ingredients include solid material comprising said composition, in that an overpressure of $AZ_2$ in which Z is at least one element selected from the group consisting of chlorine and bromine, and X are produced, and in that the overpressure of X results from the introduction of elemental X as an ingredient.

2. Method of claim 1 in which X is selenium which is introduced in amount sufficient to result in an overpressure at least one-tenth as great as that of the equilibrium pressure of vaporous Se over the surface of liquid Se at said elevated temperature.

3. Process of claim 1 in which transport is carried out in a sealed container.

4. Process of claim 1 in which transport is carried out in an open container and in which an inert gas is caused to flow through said tube in a direction within said tube away from said ingredients.

5. Process of claim 1 in which said elevated temperature is from 700° C. to 900° C.

6. Process of claim 5 in which crystallization occurs at a second temperature at least 10° cooler than said elevated temperature.

References Cited
UNITED STATES PATENTS

| | | | |
|---|---|---|---|
| 3,218,203 | 11/1965 | Ruehrwein | 23—294 |
| 3,362,795 | 1/1968 | Weisbeck | 23—294 |
| 3,480,409 | 11/1969 | Dillon et al. | 23—315 |

NORMAN YUDKOFF, Primary Examiner

S. SILVERBERG, Assistant Examiner

U.S. Cl. X.R.

23—315